(12) United States Patent
Murphy et al.

(10) Patent No.: US 6,611,391 B1
(45) Date of Patent: Aug. 26, 2003

(54) VARIABLE FORMAT TIMING RUNOUT COMPENSATION

(75) Inventors: Robert Dale Murphy, Boulder, CO (US); Daniel Scott Fisher, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 399 days.

(21) Appl. No.: 09/724,109

(22) Filed: Nov. 28, 2000

Related U.S. Application Data

(60) Provisional application No. 60/169,020, filed on Dec. 3, 1999.

(51) Int. Cl.$^7$ ............................. G11B 5/09; G11B 21/02
(52) U.S. Cl. .............................. 360/50; 360/51; 360/75; 360/48
(58) Field of Search ............................. 360/48, 51, 50, 360/27, 39, 73.03, 77.04, 72.1, 77.02, 78.04, 75, 77.08

(56) References Cited

U.S. PATENT DOCUMENTS

| | | | |
|---|---|---|---|
| 5,099,367 A | 3/1992 | Sidman | 360/77.05 |
| 5,541,784 A | 7/1996 | Cribbs et al. | 360/75 |
| 5,745,313 A * | 4/1998 | Sliger | 360/48 |
| 5,781,360 A | 7/1998 | Wilson et al. | 360/77.08 |
| 5,793,554 A | 8/1998 | Chainer et al. | 360/75 |
| 5,796,534 A * | 8/1998 | Yamamoto et al. | 360/48 |
| 5,844,742 A | 12/1998 | Yarmchuk et al. | 360/75 |
| 5,867,340 A | 2/1999 | Morehouse et al. | 360/77.04 |
| 5,907,447 A | 5/1999 | Yarmchuk et al. | 360/75 |

* cited by examiner

Primary Examiner—Andrew L. Sniezek
(74) Attorney, Agent, or Firm—Merchant & Gould P.C.

(57) ABSTRACT

A method and system of identifying and compensating for the cumulative effect of once per revolution, OPR, timing errors by modulating the size of an inter-sector runout (ISR) field between servo sectors. The ISR field is part of an inter-sector gap (ISG) field. The method begins when the nominal data field frequency is increased by one-half of the spin speed tolerance to guarantee adequate data field tolerances at the fastest portion of the timing OPR error curve. The ISR field is added to the disc format and maintained as a rotationally varying field. The ISR field is varied rotationally from a minimum of zero to a maximum equal to the timing OPR error tolerance. The size of the ISR field is varied rotationally based upon a calibration table that is used to identify the location of the disc drive head and to compensate for the appropriate timing OPR error at that location. The remainder of the ISG field is used to compensate for fixed timing errors.

19 Claims, 4 Drawing Sheets

VARIABLE FORMAT TIMING RUNOUT COMPENSATION

RELATED APPLICATIONS

This application claims priority of U.S. provisional application Ser. No. 60/169,020, filed Dec. 3, 1999.

FIELD OF THE INVENTION

This application relates generally to error correction in disc drives and more particularly to a method and system for identifying and compensating for once per revolution timing errors.

BACKGROUND OF THE INVENTION

Disc drives with written servo track information often experience the well-known phenomena of once per revolution (OPR) repeatable runout position errors resulting from a disc slip or misalignment. There are numerous causes for this disc slippage or misalignment, including thermal motor characteristics or high shock events. The disc slippage or misalignment may also be due to the servo track write process being performed on discs outside of the disc drive, such as with preformatted stamped discs. When the disc slips, or is misaligned, the disc drive head will be periodically out of position with respect to the center of the track leading to read/write errors.

Several different adaptive feedforward compensation (AFC) servo algorithms have been developed to compensate for these once per revolution repeatable runout position errors. For example, it is common to generate a servo Position Error Signal (PES) indicative of the position of the head of the disc drive with respect to the center of a selected track on a disc. The servo control system generates the PES from pre-recorded servo information stored in servo sectors on the disc drive. The servo system then uses the PES to generate a correction signal. The correction signal is provided to a power amplifier to control the amount of current through a voice coil motor actuator coil, in order to adjust the position of the head accordingly. The PES control deals satisfactorily with small OPR radial position errors.

However, disc slippage or misalignment also results in once per revolution (OPR) timing errors. These OPR timing errors result from disc misalignment in the timing direction on the disc rather than in the position direction on the disc. For example, as the position of the drive head is adjusted to correct OPR position errors, the path traveled by the head becomes less circular and more elliptical. Because the disc is divided into radial sectors in sectored servo disc drive systems and because of the adjusted path traveled by the disc drive head, OPR timing errors do occur. In a sectored servo disc drive system, the OPR timing errors present themselves as a spin speed tolerance or variation with a peak magnitude equal to the timing misalignment. To account for this misalignment, an inter-sector gap (ISG) field in the track formatting of the disc must be increased to adequately accommodate this spin speed tolerance. The inter-sector gap field is inserted between adjacent data fields on the back to account for fixed timing errors and OPR timing errors.

The size of the ISG field for each data field must be large enough to accommodate the cumulative error between servo fields in a sectored servo disc drive system with data fields between servo fields. Thus, the ISG field and format efficiency loss are magnified by the number of data fields between servo fields. For example, if there are five data fields between sequential servo fields and the resulting OPR timing error is 1%, then each ISG field separating each data field must be large enough to accommodate the 1% OPR timing error and any fixed timing errors. Such a conventional arrangement is shown in FIG. 6.

The servo sector 400 comprises servo fields 404 and a series of data fields 402. Separating each of the fields is an inter-sector gap field 406. The inter-sector gap field is inserted between data fields to account for fixed timing errors and OPR timing errors. In order to compensate for the OPR timing error, each inter-sector gap (ISG) field in the track format of the disc 108 (FIG. I) is sized in length to adequately accommodate the spin speed tolerance. In a sectored servo disc drive system with multiple data fields between servo fields, such as is shown in FIG. 6, the ISG field for each data field must be large enough to accommodate the cumulative error between consecutive servo fields. Thus, the ISG field and format efficiency loss are magnified by the number of data fields between servo fields. For example, still referring to FIG. 6, there are five data fields in the servo sector 400. Suppose the resulting OPR timing error is 1%. The size of each ISG field within the servo sector 400 must then be large enough to accommodate the 1% OPR timing error and any fixed timing errors. The size of the ISG fields together total a cumulative error of 5% between servo fields resulting in a 5% format efficiency loss, or a 5% data capacity loss. However, it should be understood that the actual OPR timing error varies from a minimum of zero to a maximum depending on the location of the head at a particular instance. Therefore, at many locations on the disc, the portions of the ISG field dedicated to correcting OPR timing errors are larger than is actually necessary to correct the OPR timing error and this is simply unused space.

Accordingly, there is a need for an improved disc drive system that identifies and compensates for actual OPR timing errors and eliminates the cumulative error between servo fields.

SUMMARY OF THE INVENTION

Against this backdrop the present invention has been developed. The present invention is a method for identifying and compensating for the cumulative effect of once per revolution (OPR) timing errors.

In one embodiment of the present invention, the nominal data field frequency is increased by one-half of the spin speed tolerance. An inter-sector runout (ISR) field is added between each of the data fields in a servo sector. Because the ISR fields will compensate for the OPR timing errors, the ISG fields in the disc format may then be reduced in size to compensate only for any fixed timing errors. The size of the ISR fields are rotationally variable from zero to the maximum OPR timing tolerance. The maximum OPR timing tolerance is the maximum amount of timing error tolerance that must be accommodated due to the elliptical shape induced by having an elliptical track. The ISR fields account for the actual OPR timing error rather than the maximum OPR timing error. Therefore, the format efficiency loss is reduced and more disk space is available for use.

These and various other features as well as advantages which characterize the present invention will be apparent from a reading of the following detailed description and a review of the associated drawings.

DETAILED DESCRIPTION

Figure 1:
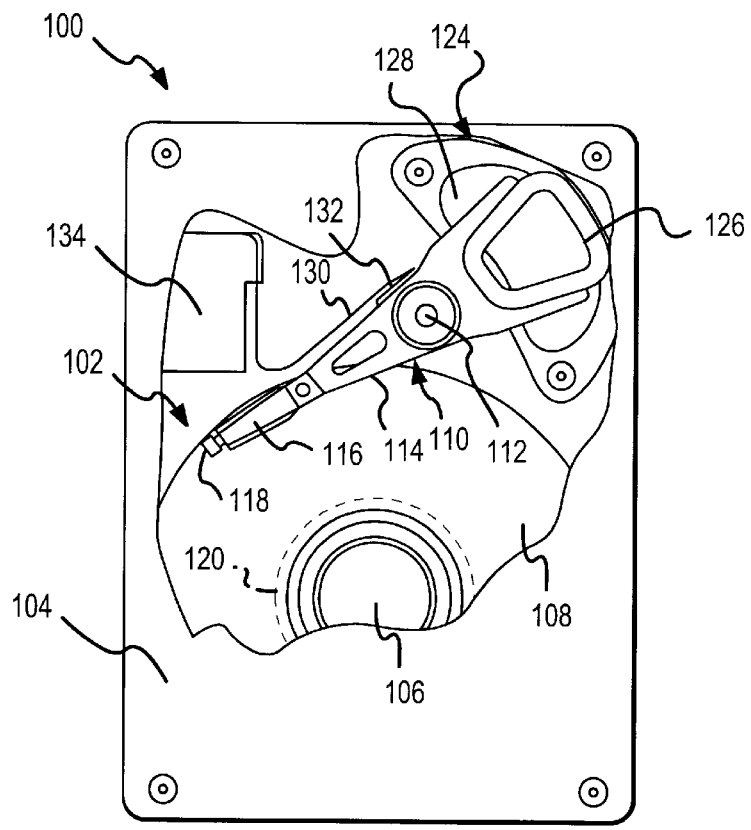
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed about a hub 107 (not shown in FIG. 1). Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
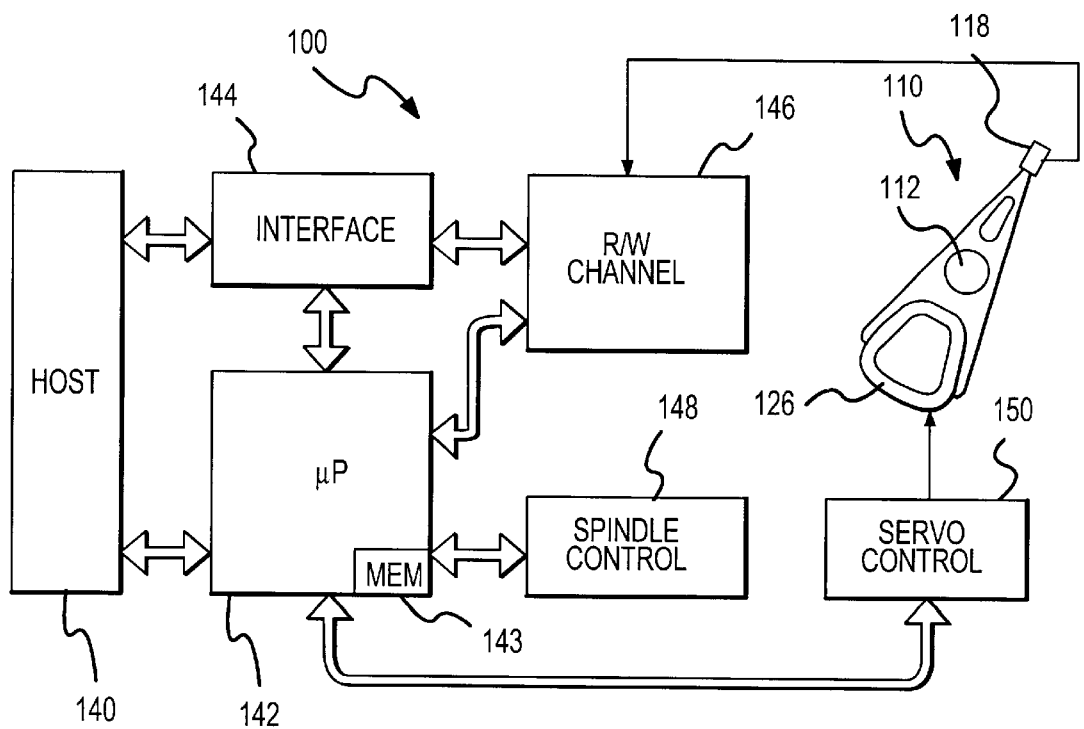
FIG. 2 is a simplified functional block diagram of the disc drive shown in FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity and acceleration of the head 118, and uses that information in conjunction with a model, stored in memory 143, to communicate with the servo control circuit 150, which will apply a controlled amount of current to the voice coil motor col 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140.

Figure 3:
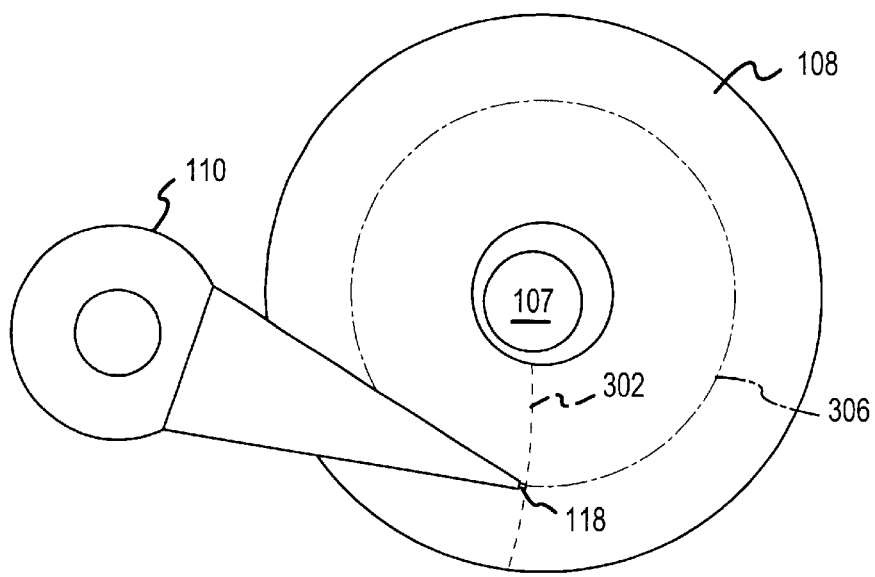
FIG. 3 is an illustration of an exemplary case of disc drive misalignment

FIG. 3 is a schematic illustration of an exemplary simplified case of disc drive misalignment. As described above, a disc drive with written servo track information may experience the well-known phenomena of once per revolution (OPR) repeatable runout position errors resulting from a disc slip or disc misalignment. For example, suppose disc 108 is misaligned on hub 107. As the disc 108 rotates about the hub 107, the head 118 of actuator assembly 110 becomes misaligned in the position direction 302 of the disc. This misalignment in the position direction is known as once per revolution repeatable runout position error.

Several different adaptive feedforward compensation (AFC) servo algorithms have been developed to compensate for these once per revolution repeatable runout position errors. For example, it is common to generate a servo Position Error Signal (PES) indicative of the position of the head 118 of the disc drive with respect to the center of a selected track on the disc 108. During track following in which the head is caused to follow a selected track, a servo system generates the PES from the received servo information and then uses the PES to generate a correction signal which is provided to a power amplifier to control the amount of current through an actuator coil, in order to adjust the position of the head accordingly. Thus, suitable techniques have been developed for dealing with OPR position errors.

Figure 4:
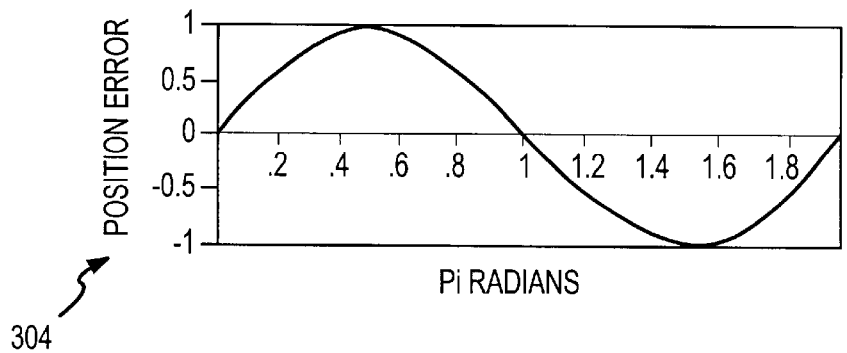
FIG. 4 is a graph illustrating exemplary once per revolution position errors resulting from disc misalignment.

Referring now to FIG. 4, graph 304 illustrates a position error signal (PES) 307 plotted on the y-axis with pi radians plotted on the x-axis. It should be understood that the position error signal 307 is a sinusoidal curve where the positive and negative maximum are equal to the maximum position error. As illustrated in graph 304, the position error signal 307 and, in turn, the correction signal may vary depending on the angular position where the head 118 is located at any particular moment.

Disc slippage or misalignment also results in once per revolution (OPR) timing errors. These OPR timing errors result from disc misalignment in the timing direction on the disc 108 rather than in the position direction on the disc. For example, as the position of the head 118 is adjusted to compensate for position errors, the path 306 traveled by the head 118 becomes less circular and more elliptical. Because the disc 108 is divided into sectors in sectored disc drive systems and because of the adjusted path traveled by the disc drive head 118, OPR timing errors occur. The OPR timing errors present themselves as a spin speed tolerance with peak magnitude equal to the timing error. The spin speed tolerance is a percent variation of spindle speed as compared to the nominal spindle speed.

Figure 5:
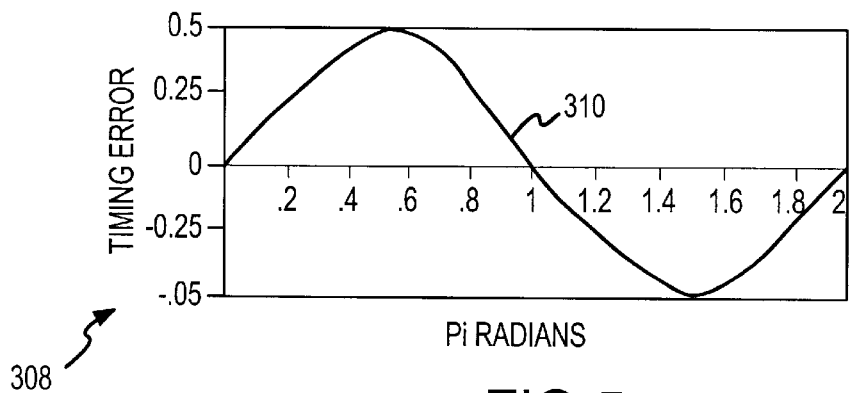
FIG. 5 is a graph illustrating exemplary once per revolution timing errors resulting from disc misalignment.

For example, referring to FIG. 5, graph 308 illustrates a timing error 310 with a peak magnitude of 0.5% plotted versus pi radians. As illustrated in graph 308, the timing error 310 varies depending on the position where the head 118 is located at any particular moment.

In order to minimize the format efficiency loss described above with reference to FIG. 6, the present invention provides a method of identifying and compensating for the cumulative effect of OPR timing errors by modulating by size of subsections of the ISG fields (known as ISR fields) between servo sectors. A portion of the ISG field, referred to herein as the inter-sector runout (ISR) field, is defined as being equal to the actual OPR timing error at a specific angular position around the path 306 (FIG. 3). The remainder of the ISG field is used to compensate for fixed timing errors. By adjusting the size of the ISR field to compensate for the actual OPR timing error, the present invention minimizes the total size of each of the ISG field, thereby improving format efficiency and increasing disk storage capacity.

Figure 7:
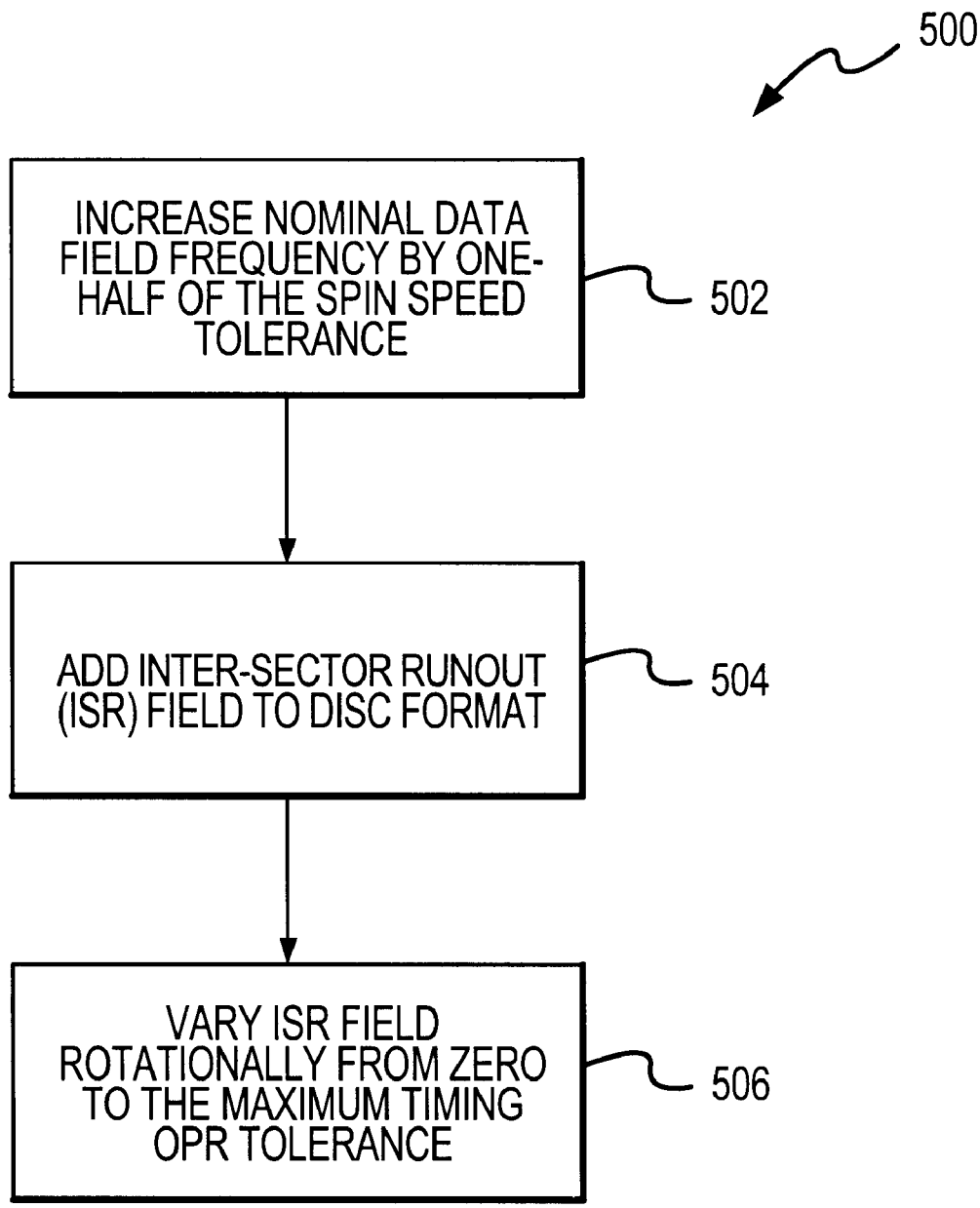
FIG. 7 is a flowchart describing a method of identifying and compensating for cumulative OPR timing errors in accordance with one preferred embodiment of the present invention.

FIG. 7 is a flowchart describing a method 500 of identifying and compensating for cumulative OPR timing errors in accordance with one exemplary embodiment of the present invention. The logical operations in FIG. 7 are implemented as a sequence of computer-implemented operations running on a computing system and/or as interconnected machine logic modules within the computing system. The implementation is a matter of choice dependent on the performance requirements of the computing system implementing the invention. Accordingly, the logical operations making up the embodiments of the present invention described herein are referred to as operations. One skilled in the art will recognize that these operations may be implemented in software, firmware, special purpose digital logic, and any combination thereof without departing from the spirit and scope of the present invention as recited in the attached claims.

The method 500 begins in operation 502 as the nominal data field transfer rate is increased by one-half of the spin speed tolerance in order to guarantee adequate data field tolerances at the fastest portion of the OPR timing error graph. It should be understood that operation 502 increases the data rate by one-half percent and the sinusoidal error is shifted down one-half percent so that it is always within the tolerance of the ISR (which can only be positive). Operation 502 transforms the timing error graph 308 (FIG. 5) to graph 600 illustrated in FIG. 8. Control then transfers to operation 504.

Figure 9:
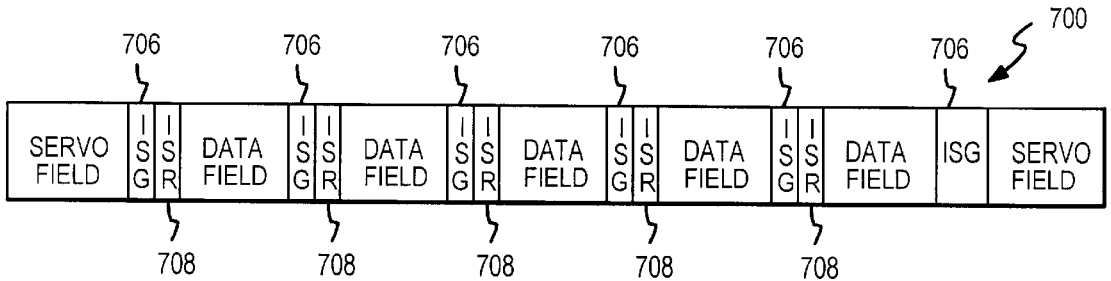
FIG. 9 is an illustration of a servo sector comprising an inter-sector runout (ISR) field between each data field in accordance with another preferred embodiment of the present invention.

In operation 504, an inter-sector runout (ISR) field is added to the disc format and is maintained as a rotationally varying field. The new format 700 with the ISR fields 708 is illustrated in FIG. 9. The new disc format 700 comprises ISG fields 706 that have been reduced in size because they only are used to compensate for fixed timing errors and are no longer used to account for OPR timing errors. Control then transfers to operation 506.

In operation 506, the size of the ISR fields 708 is varied rotationally from 0 to the maximum timing OPR tolerance. These rotationally varied ISR fields reduce the format efficiency loss experienced by the prior art. The only resulting format efficiency loss in the present invention is due to the one-half spin speed tolerance increase in data field transfer rate which, using the example described in reference to FIG. 6, results in only a 0.5% loss in format efficiency instead of 5%. It should be understood that, in one embodiment, the size of the ISR fields are rotationally varied using data stored in a calibration table in memory 143 (FIG. 1). The calibration table is preferably stored in memory 143 using a loose format that can be recovered with default values in the drives system log.

Figure 8:
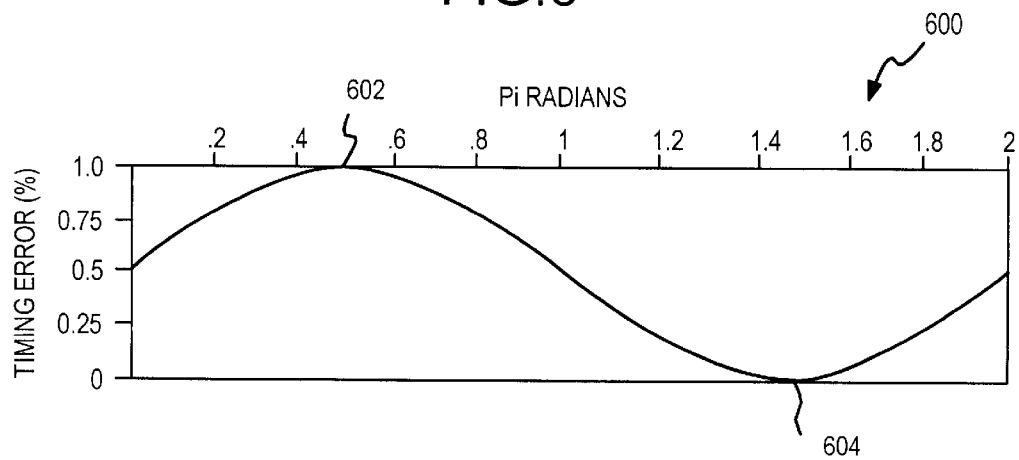
FIG. 8 is a graph illustrating timing error plotted versus pi radians after increasing the nominal data field transfer rate by one-half of the spin speed tolerance in accordance with one preferred embodiment of the present invention.

FIG. 8 is a graph illustrating timing error plotted versus rotational position in radians after increasing the nominal data field transfer rate by one-half of the spin speed tolerance. At rotational location 604, the velocity of the head 118 of the disc drive with respect to the track is at a maximum. Thus, data is read/written at its fastest at rotational location 604. At rotational location 602, the velocity of the head 118 with respect to the track is a minimum. Thus, data is read/written at its slowest at rotational location 602. Accordingly, as described above, the present invention adjusts the size, i.e. length, of the ISR field to be a minimum (e.g., zero) at rotational location 604 and to be a maximum (1% in this example) at rotational location 602. Thus, at each rotational location on graph 600, the size (length) of the ISR field is adjusted to accurately reflect and compensate for the actual OPR timing error.

In summary, the present invention may be viewed as a method (500 in FIG. 7) for compensating for a once per revolution timing error in a disc drive 100. A nominal data field frequency of the disc drive 100 is increased by one-half of a spin speed tolerance of the disc drive in operation 502. An inter-sector runout field is added to a disc format of the disc drive in operation 504. The inter-sector runout field length is varied rotationally as a disc on the disc drive spins in operation 506.

In one embodiment, the size of the inter-sector runout field is varied from zero to a maximum timing once per revolution tolerance. The size of the inter-sector gap field in the disc format of the disc drive may also be reduced in some embodiments because the inter-sector gap field no longer needs to compensate for the OPR timing error. In another embodiment, the size of the inter-sector runout field 708 is varied according to data stored in a table. The table is preferably generated during factory calibration of the disc drive 100. Tables, or curves, identifying the rotational location of the disc drive head 118, the once per revolution timing error at each rotational location, and the size of the inter-sector runout field 708 at each rotational location may be generated during factory calibration. The generated tables, or curves, may be stored in a memory 143 or on a disc 108 in the disc drive 100.

The invention may also be viewed as a system for compensating for a once per revolution timing error in a disc drive. The system may include a calibration table and means for rotationally varying an inter-sector runout field in a format of the disc drive according to the once per revolution timing error determined using the calibration table.

Figure 6:
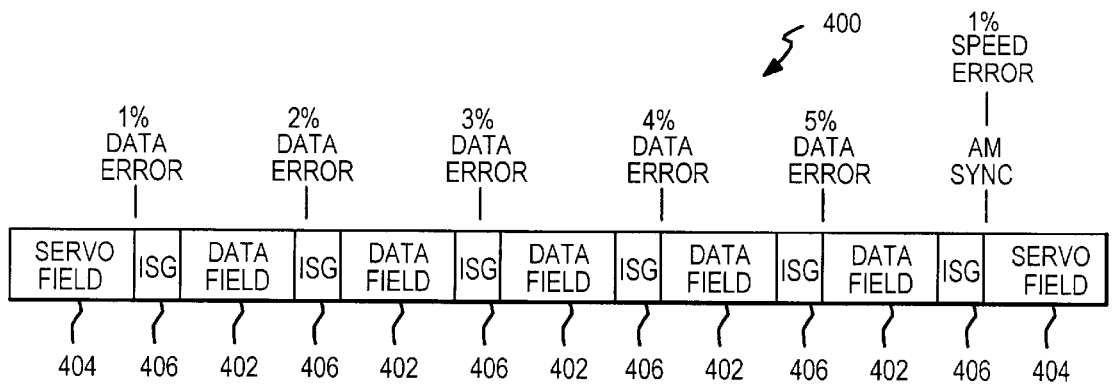
FIG. 6 is an illustration of a typical prior art servo sector scheme comprising data fields and intersector gap fields and bounded by two servo fields.

In another embodiment of the invention, the inter sector gap (ISG) fields may be made different sizes to prevent cumulative error. Typically (and as shown in FIG. 6), the ISG fields are large enough to accommodate the total error between once per revolution synchronization or index marks of the disc. For example, as illustrated by FIG. 6, each ISG field 406 is large enough to accommodate the total error (1%) between synchronization. However, in one embodiment, rather than maintaining a rotationally varying ISR field, this embodiment of the present invention maintains the ISG field size to be equal to the data error corresponding to the position of the particular data field. For example, the first data field would have a ISG field to compensate for a 0.2% data error, the second data field would have a ISG field to compensate for a 0.4% data error, the third data field would have a ISG field to compensate for a 0.6% data error, etc. Thus, in this embodiment of the present invention, instead of a 1% compensation for each ISG field (1% for each ISG field) as in FIG. 6; the average compensation is 0.6% for each ISG field ((0.2+0.4+0.6+0.8+1.0) divided by 5). Thus, disc space is saved for more data. This compensation may be made by adjusting the hardware of the disc drive to recognize that the ISG field lengths vary instead of remaining the same for each data field.

In summary, the present invention may be viewed as a method (such as in operations 500) for compensating for a once per revolution timing error (such as 310) in a disc drive (such as 100). This method includes steps of (a) increasing a nominal data field frequency of the disc drive by one-half of a spin speed tolerance of the disc drive (such as in operation 502), (b) adding an inter-sector runout field to a disc format (such as in operation 504) of the disc drive (such as 100), and (c) rotationally varying a size of the inter-sector runout field (such as in operation 506) to compensate for the once per revolution timing error. The varying step (c) may include varying the inter-sector runout field size from zero to a maximum timing once per revolution tolerance (such as in operation 506). The method further may include a step (d) of sizing an inter-sector gap field (such as 706) in the disc format of the disc drive to compensate only for fixed timing errors.

The inter-sector runout field (such as 708) varying step (c) (such as in operation 506) may include rotationally varying the intersector runout field size (such as 708) according to data stored by the disc drive (such as 100) in a calibration table. This calibration table may be a factory calibration test curve (such as 600) that is used to identify a location of a disc drive head, to determine the once per revolution timing error at the identified location, and to vary the inter-sector runout field size to compensate for the once per revolution timing error. The calibration table is preferably stored in a memory location (such as 143) in the disc drive and is generated during a set-up procedure for the disc drive.

Alternatively, the present invention may be viewed as a system for compensating for a once per revolution timing error in a disc drive that includes an inter-sector runout field formed in a disc format (such as 700) of the disc drive (such as 100) and a processor (such as 142) which determines a rotational location of a head (such as 118) in the disc drive (such as 100), determines once per revolution timing error (such as 308, 600) at the location, and adjusts the inter-sector runout field (such as 708) size to compensate for the once per revolution timing error (such as 308). The system may also have an inter-sector gap field (such as 706) in the disc format (such as 700) of the disc drive (such as 100). The inter-sector gap field (such as 706) is preferably sized to compensate for fixed timing errors in the disc drive. The system may also have a calibration table stored in a memory (such as 143) in the disc drive that contains once per revolution timing error compensation information. The processor (such as 142) determines the location of the head (such as 118) in the disc drive (such as 100) using the calibration table and determines the once per revolution timing error (such as 310) at the location of the head (such as 118) using information in the calibration table.

A still further alternative view of the invention is as a method (such as operations 500) for compensating for cumulative timing errors (such as 310) in a disc drive format (such as 700) that includes a plurality of servo fields (such as 404) and a plurality of data fields (such as 402) between the servo fields, in which there are a plurality of inter-sector gap fields (such as 406) interspersed between the data fields. The method includes steps (a) determining the cumulative timing error (such as 310) at a location of a data field (such as 402), (b) setting an inter-sector gap field (such as 402) to a length to compensate for the cumulative timing error, and (c) repeating the determination and setting steps for each of a plurality of data fields.

This method is preferably performed during formatting of the disc drive and utilizes a calibration table stored in a disc drive (such as 100) that stores information, in particular, a rotational location of a disc drive head (such as 118) in the disc drive and an inter-sector runout field length associated with the rotational location. The calibration table is used to add the inter-sector runout field (such as 708) to a disc drive format for the disc drive. The calibration table may further be used to maintain the intersector runout field (such as 708) as a rotationally varying field such that the intersector runout field compensates for the once per revolution timing error (such as 310) at the rotational location. This calibration table is preferably stored in a memory location in the disc drive such as 143 or on a disc (such as 108) itself.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, in an alternative embodiment, the present invention may be used with pre-written discs, such as discs that have their servo write performed outside of the disc drive. These discs typically have high once per revolution position and timing errors because of the non-concentricity errors introduced by preformatting prior to assembly of the disc pack. The present invention is also highly effective for discs that have a large number of data fields between servo fields because these discs typically experience large once per revolution timing and position errors. Numerous other changes may be made which will readily suggest themselves to those skilled in the art and which are encompassed in the spirit of the invention disclosed and as defined in the appended claims.

What is claimed is:

1. A method for compensating for a once per revolution timing error in a disc drive, the method comprising steps of:
   (a) increasing a nominal data field frequency of the disc drive by one-half of a spin speed tolerance of the disc drive;
   (b) adding an inter-sector runout field to a disc format of the disc drive; and
   (c) rotationally varying a size of the inter-sector runout field to compensate for the once per revolution timing error.

2. The method according to claim 1 wherein the varying step (c) includes varying the inter-sector runout field size from zero to a maximum timing once per revolution tolerance.

3. The method according to claim 2 wherein the inter-sector runout field varying step (c) includes rotationally varying the intersector runout field size according to data stored by the disc drive in a calibration table.

4. The method according to claim 3 wherein the calibration table comprises a factory calibration test curve that is used to identify a location of a disc drive head, to determine the once per revolution timing error at the identified location, and to vary the inter-sector runout field size to compensate for the once per revolution timing error.

5. The method according to claim 3 wherein the calibration table is stored in a memory location in the disc drive.

6. The method according to claim 3 wherein the calibration table is generated during a set-up procedure for the disc drive.

7. The method according to claim 1 further comprising step of:
   (d) sizing an inter-sector gap field in the disc format of the disc drive to compensate only for fixed timing errors.

8. A system for compensating for a once per revolution timing error in a disc drive comprising:
   an inter-sector runout field formed in a disc format of the disc drive; and
   a processor which determines a rotational location of a head in the disc drive, determines once per revolution timing error at the location, and adjusts the inter-sector runout field size to compensate for the once per revolution timing error.

9. The system according to claim 8 further comprising an inter-sector gap field in the disc format of the disc drive.

10. The system according to claim 9 wherein the inter-sector gap field is sized to compensate for fixed timing errors in the disc drive.

11. The system according to claim 8 further comprising a calibration table stored in a memory in the disc drive containing once per revolution timing error compensation information.

12. The system according to claim 8 wherein the processor determines the location of the head in the disc drive using the calibration table.

13. The system according to claim 12 wherein the processor determines the once per revolution timing error at the location of the head using information in the calibration table.

14. A method for compensating for cumulative timing errors in a disc drive format comprising a plurality of servo fields and a plurality of data fields between the servo fields with a plurality of inter-sector gap fields, the method comprising steps of:
   (a) determining the cumulative timing error at a location of a data field;
   (b) setting an inter-sector gap field to a length to compensate for the cumulative timing error; and
   (c) repeating the determination and setting steps for each of a plurality of data fields.

15. The method of claim 14 wherein the method is performed during formatting of the disc drive.

16. A calibration table stored in a disc drive comprising:
   a rotational location of a disc drive head in the disc drive; and
   an inter-sector runout field length associated with the rotational location, wherein the calibration table is used to add the inter-sector runout field to a disc drive format for the disc drive.

17. The calibration table of claim 16 wherein the calibration table is further used to maintain the intersector runout field as a rotationally varying field such that the intersector runout field compensates for the once per revolution timing error at the rotational location.

18. The calibration table of claim 16 wherein the calibration table is stored in a memory location in the disc drive.

19. A disc drive comprising:
   a data disc having a once per revolution timing error; and
   means for determining the once per revolution timing error at a head location on the disc and adjusting an inter-sector runout field to compensate for the once per revolution timing error.

* * * * *